(12) United States Patent
Wang et al.

(10) Patent No.: US 11,531,313 B2
(45) Date of Patent: Dec. 20, 2022

(54) STM32-BASED AUTOMATIC CONTROL SYSTEM AND METHOD FOR BROADCAST TRANSMITTER

(71) Applicant: Shaanxi University of Science & Technology, Xi'an (CN)

(72) Inventors: Mingwei Wang, Xi'an (CN); Zhao Wang, Xi'an (CN); Kaisheng Shi, Xi'an (CN); Rui Yan, Xi'an (CN); Yeqi Huang, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 15 days.

(21) Appl. No.: 17/381,747

(22) Filed: Jul. 21, 2021

(65) Prior Publication Data

US 2022/0147001 A1    May 12, 2022

(30) Foreign Application Priority Data

Nov. 6, 2020 (CN) .......................... 202011227877.6

(51) Int. Cl.
*G05B 19/04* (2006.01)
*G05B 19/042* (2006.01)
*H04W 52/00* (2009.01)
*H04W 72/04* (2009.01)
*H04W 52/04* (2009.01)

(52) U.S. Cl.
CPC .......... *G05B 19/042* (2013.01); *H04W 52/00* (2013.01); *H04W 52/04* (2013.01); *H04W 72/044* (2013.01)

(58) Field of Classification Search
CPC ........ G05B 19/042; G05B 2219/25032; G05B 2219/25171; G05B 2219/25257; G05B 2219/2651; G05B 2219/25176; H04W 52/00; H04W 52/04; H04W 72/044
USPC ........................................................... 455/29
See application file for complete search history.

(56) References Cited

U.S. PATENT DOCUMENTS

2013/0260681 A1* 10/2013 Hsi ........................ H04W 4/80
                                                    455/41.1

* cited by examiner

*Primary Examiner* — Shaima Q Aminzay
(74) *Attorney, Agent, or Firm* — Barclay Damon LLP

(57) ABSTRACT

The present disclosure provides an STM32-based automatic control system for a broadcast transmitter, including an STM32 microcontroller, a host computer, a drive unit, a touch screen unit, a local network server unit, an image acquisition unit and a sampling unit, wherein the STM32 microcontroller is connected to the host computer. An output interface of the STM32 microcontroller is connected to the drive unit, wherein the touch screen unit is configured to display acquired information that is processed, and receive a control instruction of a touch operation. The local network server unit is configured to achieve remote network display of transmitter information and remote network control, the image acquisition unit is configured to timely acquire an image in a cabinet of the transmitter such that a maintainer can conduct remote observation, and the sampling unit is configured to control the drive unit to achieve automatic control of the transmitter.

11 Claims, 13 Drawing Sheets

| Pin | Signal | # |
|---|---|---|
| PB8 | EXTERNAL INTERLOCK OUT-H | 167 |
| BOOT0 | BOOT0 | 166 |
| I2C1_SDA/PB7 | I2C1_SDA | 165 |
| I2C1_SCL/PB6 | I2C1_SCL | 164 |
| PB5 | GATE INTERLOCK OUT-H | 163 |
| JTRST/PB4 | JTRST | 162 |
| JTDO/PB3 | JTDO | 161 |
| PG15 | OVER-VOLTAGE OUT-H | 160 |
| VDD | VDD | 159 |
| VSS | VSS | 158 |
| PG14 | OVER-CURRENT OUT-H | 157 |
| PG13 | DATA STROBE OUT-H | 156 |
| PG12 | DATA RESET OUT-L | 155 |
| PG11 | B1-OUT | 154 |
| PG10 | B2-OUT | 153 |
| PG9 | B3-OUT | 152 |
| PD7 | UNDER-DRIVE OUT-H | 151 |
| PD6 | USART2_RX | 150 |
| VDD | VDD | 149 |
| VSS | VSS | 148 |
| PD5 | USART2_TX | 147 |
| PD4 | OVER-DRIVE OUT-H | 146 |
| PD3 | WIND OUT-H | 145 |
| PD2 | ANALOG BOARD+15VOUT-H | 144 |
| PD1 | ANALOG BOARD-15VOUT-H | 143 |
| PD0 | A/D BOARD+15VOUT-H | 142 |

N1
STM32F429IGT6
LQFP176

VDD:15,23,36,49,62,72,82,91,103,114,127,136,149,159,172
VSS:14,22,48,61,71,90,102,113,126,135,148,158,
VSSA:37
VDDA:39

FIG.2B

| | | | |
|---|---|---|---|
| | VDD | 23 | VDD |
| ANTENNA STANDING WAVE IN-L | | 24 | PF6 |
| NETWORK STANDING WAVE IN-L | | 25 | PF7 |
| ANALOG BOARD+15VIN-L | | 26 | PF8 |
| ANALOG BOARD-15VIN-L | | 27 | PF9 |
| | | 28 | PF10 |
| | OSC_IN | 29 | PH0 |
| | OSC_OUT | 30 | PH1 |
| | NRST | 31 | NRST |
| -8V SAMPLING | ADC_IN10 | 32 | PC0 |
| +8V SAMPLING | ADC_IN11 | 33 | PC1 |
| -22V SAMPLING | ADC_IN12 | 34 | PC2 |
| +22V SAMPLING | ADC_IN13 | 35 | PC3 |
| | VDD | 36 | VDD |
| | VSSA | 37 | VSSA |
| | VREF+ | 38 | VREF+ |
| | VDDA | 39 | VDDA |
| INCIDENT POWER | ADC_IN0 | 40 | PA0 |
| REFLECTION POWER ADC-IN1 | | 41 | PA1 |
| POWER AMPLIFIER CURRENT ADC_IN2 | | 42 | PA2 |
| AD CONVERSION+15VIN-L | | 43 | PH2 |
| AD CONVERSION-15VIN-L | | 44 | PH3 |

Pins 45–53: PH4, PH5, PA3, VSS, VDD, PA4, PA5, PA6, PA7

- 45: A/D CONVERSION+5VIN-L
- 46: A/D CONVERSION FAULT IN-L
- 47: POWER AMPLIFIER VOLTAGE ADC_IN3
- 48: VSS
- 49: VDD
- 50: DAC_OUT1 — POWER CONTROL
- 51: DAC_OUT2
- 52: ADC_IN6 — FILTER RESET
- 53: ADC_IN7 — ANTENNA ZERO

DFGD

FIG.2D

| Pin | Signal | Label |
|---|---|---|
| RADIO FREQUENCY DRIVE | ADC_IN14 | 54 PC4 |
| AMPLITUDE MODULATION | ADC_IN15 | 55 PC5 |
| CONTROL VOLTAGE+5V | ADC_IN8 | 56 PB0 |
| CONTROL VOLTAGE+3.3V | ADC_IN9 | 57 PB1 |
| | BOOT1 | 58 PB2/BOOT1 |
| DIRECT CURRENT STABILIZER B+IN−L | | 59 PF11 |
| DIRECT CURRENT STABILIZER B−IN−L | | 60 PF12 |
| | VSS | 61 VSS |
| | VDD | 62 VDD |
| WIND IN−L | | 63 PF13 |
| ALTERNATING CURRENT MAIN POWER SOURCE IN−L | | 64 PF14 |
| REMOTE CONTROL STATE IN−L | | 65 PF15 |
| B12−OUT | | 66 PG0 |
| B11−OUT | | 67 PG1 |
| CONTROL BOARD+5VIN−L | | 68 PE7 |
| CONTROL BOARD−15VIN−L | | 69 PE8 |
| CONTROL BOARD+15VIN−L | | 70 PE9 |
| | VSS | 71 VSS |
| | VDD | 72 VDD |
| CONTROL BOARD 3.3V FAULT L | | 73 PE10 |
| LOW POWER CONTROL IN−L | | 74 PE11 |
| MEDIUM POWER CONTROL IN−L | | 75 PE12 |
| HIGH POWER CONTROL IN−L | | 76 PE13 |
| POWER INCREASE CONTROL IN−L | | 77 PE14 |
| POWER REDUCTION CONTROL IN−L | | 78 PE15 |

FIG.2E

STM32-BASED AUTOMATIC CONTROL SYSTEM AND METHOD FOR BROADCAST TRANSMITTER

CROSS REFERENCE TO RELATED APPLICATION(S)

This patent application claims the benefit and priority of Chinese Patent Application No. 202011227877.6, filed on Nov. 6, 2020, the disclosure of which is incorporated by reference herein in its entirety as part of the present application.

TECHNICAL FIELD

The present disclosure relates to the technical field of automatic control of broadcast transmitters, and in particular, to an STM32-based automatic control system and method for a broadcast transmitter.

BACKGROUND ART

Through an automatic control technology for broadcast transmitters, a transmitter can automatically adjust each of its components to a corresponding working state according to set working power, working frequency and power on/power off time. When a control instruction is issued by a host computer or through a touch screen, a mainboard will automatically control a corresponding drive unit to execute the instruction according to acquired state information of the transmitter. Meanwhile, under the impact of environment and equipment state, an incident power, a power amplifier voltage, a power amplifier current and fault state data of the transmitter need to be acquired. As a result, the transmitter can automatically adjust the incident power and the power amplifier voltage, or conduct fault reset and restart during unstable work. Accordingly, the transmitter can maintain normal work, and conduct automatic power off and alarm when meeting serious faults, thereby protecting hardware of the transmitter.

Due to evolving requirements, the automatic control technology for broadcast transmitters develops increasingly. At present, an automatic control device for a broadcast transmitter on the market essentially consists of an industrial control computer, a multifunctional data acquisition board and a programmable logic control board. Thus, deficiencies such as large volume, high cost and poor maintainability are caused. For above reasons, the applicant proposes the present disclosure.

SUMMARY

The present disclosure aims to provide an STM32-based automatic control system for a broadcast transmitter.

To achieve the above purpose, the present disclosure provides the following technical solutions:

First and according to at least one aspect, a STM32-based automatic control system for a broadcast transmitter is provided, which includes a mainboard and a power module; a control unit is disposed on the mainboard, and includes an STM32 microcontroller; the STM32 microcontroller is connected to a host computer through an RS485 standard serial interface, and receives an instruction sent by the host computer; an output interface of the STM32 microcontroller is connected to a drive unit, and the STM32 microcontroller controls the drive unit to execute the instruction; the STM32 microcontroller is connected to a sampling unit through an input pin, computes a control operation to be executed by the transmitter through acquiring state information, fault information, and information of an incident power, a power amplifier voltage and a power amplifier current of the transmitter, and controls the drive unit to achieve automatic control of the transmitter; the STM32 microcontroller is connected to a touch screen unit through an RS232 standard serial interface, which is configured to display the acquired information that is processed, and to receive a control instruction of a touch operation; the STM32 microcontroller is connected to an image acquisition unit through a controller area network (CAN) bus, which is configured to timely acquire an image in a cabinet of the transmitter, and to upload the image through a local network server such that a maintainer can remotely inspect a condition in the transmitter; the STM32 microcontroller is further connected to the local network server unit through the controller area network (CAN) bus, which is configured to upload acquired state information and image information of the transmitter to a network server to achieve remote network display, and to receive a remote control instruction from a network to adjust a working state of the transmitter; and the power module is connected to each of the control unit, the touch screen unit, the sampling unit, the image acquisition unit, the local network server unit and the drive unit, to supply power.

Preferably, the STM32 microcontroller may be further connected to a storage unit, which stores a control parameter and ensures that the parameter will not be lost during power failure and can be inquired by the host computer.

Preferably, the image acquisition unit may include several cameras, each of which is configured to correspondingly acquire an image of a key position in the transmitter.

Preferably, the local network server unit may include an STM32F103ZET6 type chip running server program, wherein an Ethernet connector may be connected to a network router through a cable, and an intranet penetration device may be connected to the network router to achieve mapping of a fixed domain name by a local server.

Preferably, the drive unit may include several parallel drive circuits, each of which is connected to a corresponding external output end.

Preferably, the sampling unit may include several digital quantity sampling circuits and analog quantity sampling circuits.

Preferably, the STM32 microcontroller may adopt an STM32F429IGT6 chip.

Preferably, the touch screen unit may adopt a serial instruction screen of Dwin Technology.

In the present disclosure, the STM32-based automatic control system for a broadcast transmitter is small in volume, rich in hardware and high in processing capacity. The STM32 microcontroller is used as a central processing unit, which connects and expands hardware through a system bus, and integrates the hardware on the mainboard to achieve effective integration of the system. Therefore, the control system can improve its stability, reduce its cost, and provide a good human-computer interaction interface and functions such as remote Ethernet monitoring and data acquisition.

Compared with the existing control technology for broadcast transmitters, the herein described system adopts an STM32ARM chip as a core controller, and integrity, stability and running speed of the chip are higher than that of chips such as 51 chips and programmable logic controller (PLC) chips widely used in the present field of control of broadcast transmitters. In addition, besides the STM32 microcontroller, the present invention provides the image acquisition unit and the local network server unit, thereby achieving data acquisition of an image in the cabinet of the broadcast transmitter, as well as remote network access and remote network control of real-time running data of the broadcast transmitter. As a result, the herein described system greatly facilitates daily maintenance of a maintainer of a manufacturer of the transmitter, and reduces a traffic cost and a time cost of the maintainer for getting to a deployment site of the transmitter. The maintainer can remotely access to the local server of the transmitter at any time, conduct inspection according to real-time state data of the transmitter and acquired physical image information, and adjust the transmitter through remote network control. Moreover, a hardware cost of the herein described system is not increased, and the used technology is mature, stable and easy. Furthermore, the control system for the transmitter has an automatic control function and a remote intervention function, so that it's use cost is lower than that of the prior art.

Figure 1:
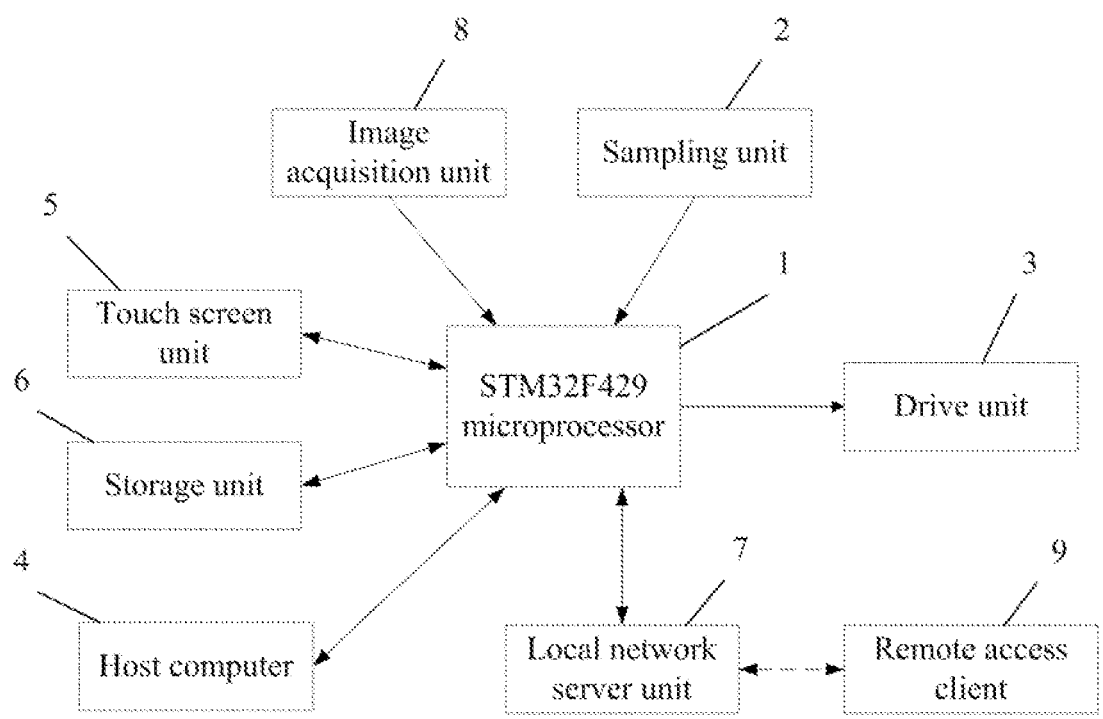
FIG. 1 is a schematic diagram of a structure principle according to aspects of the present invention.

In the drawings, 1 represents an STM32F429 microprocessor, 2 represents a sampling unit, 3 represents a drive unit, 4 represents a host computer, 5 represents a touch screen unit, 6 represents a storage unit, 7 represents a local network server unit, 8 represents an image acquisition unit, 9 represents a remote access client, 10 represents a controller area network (CAN) bus, 11 represents cameras, 12 represents an STM32F103 microprocessor, 13 represents a network router, 14 represents an intranet penetration device, and 15 represents the Internet.

DETAILED DESCRIPTION OF THE EMBODIMENTS

The following contents clearly and completely describe the technical solutions in the embodiments of the present disclosure with reference to the accompanying drawings.

As shown in FIG. 1, an STM32-based automatic control system for a broadcast transmitter is provided, which includes a mainboard and a power module. A control unit is disposed on the mainboard, and includes an STM32F429 microprocessor 1. The STM32F429 microprocessor 1 is connected to a host computer 4 through an RS485 standard serial interface, and receives an instruction sent by the host computer 4. An output interface of the STM32F429 microprocessor 1 is connected to a drive unit 3, and the STM32F429 microprocessor controls the drive unit 3 to execute a control instruction The STM32F429 microprocessor 1 is connected to a sampling unit 2 through an input pin, computes a control operation to be executed by the transmitter through acquiring state information, fault information, and information of an incident power, a power amplifier voltage and a power amplifier current of the transmitter, and controls the drive unit 3 to achieve automatic control of the transmitter. The STM32F429 microprocessor 1 is connected to an image acquisition unit 8 through a controller area network (CAN) bus, which is configured to timely shoot a key part in the transmitter through cameras of the image acquisition unit to obtain image information, and to upload the image to a local network server such that a maintainer can remotely inspect a physical state of the transmitter The STM32F429 microprocessor 1 is connected to a local network server unit 7 through the controller area network (CAN) bus, which is configured to establish the local network server and map it into a domain name of a public network, thereby achieving real-time remote network access of a remote access client 9 to information of the transmitter, and real-time remote network control of the remote access client 9 to a running state of the transmitter. The STM32F429 microprocessor 1 is connected to a touch screen unit 5 through an RS232 standard serial interface, which is configured to display the acquired information that is processed, and to receive a control instruction of a touch operation. Finally, the power module is connected to each of the control unit 1, the sampling unit 2, the drive unit 3, the touch screen unit 5, the local network server unit 7 and the image acquisition unit 8, to supply power.

Figures 2, 2A:
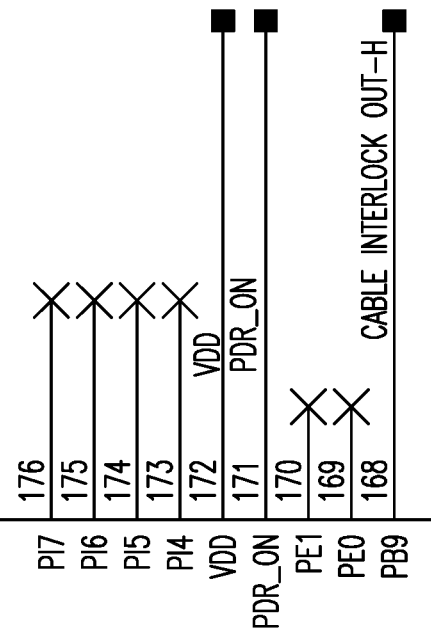
FIG. 2 (shown collectively as FIGS. 2A-2F) is a distribution diagram of pins of an STM32F429IGT6 microprocessor of the described system.
Figure 2C:
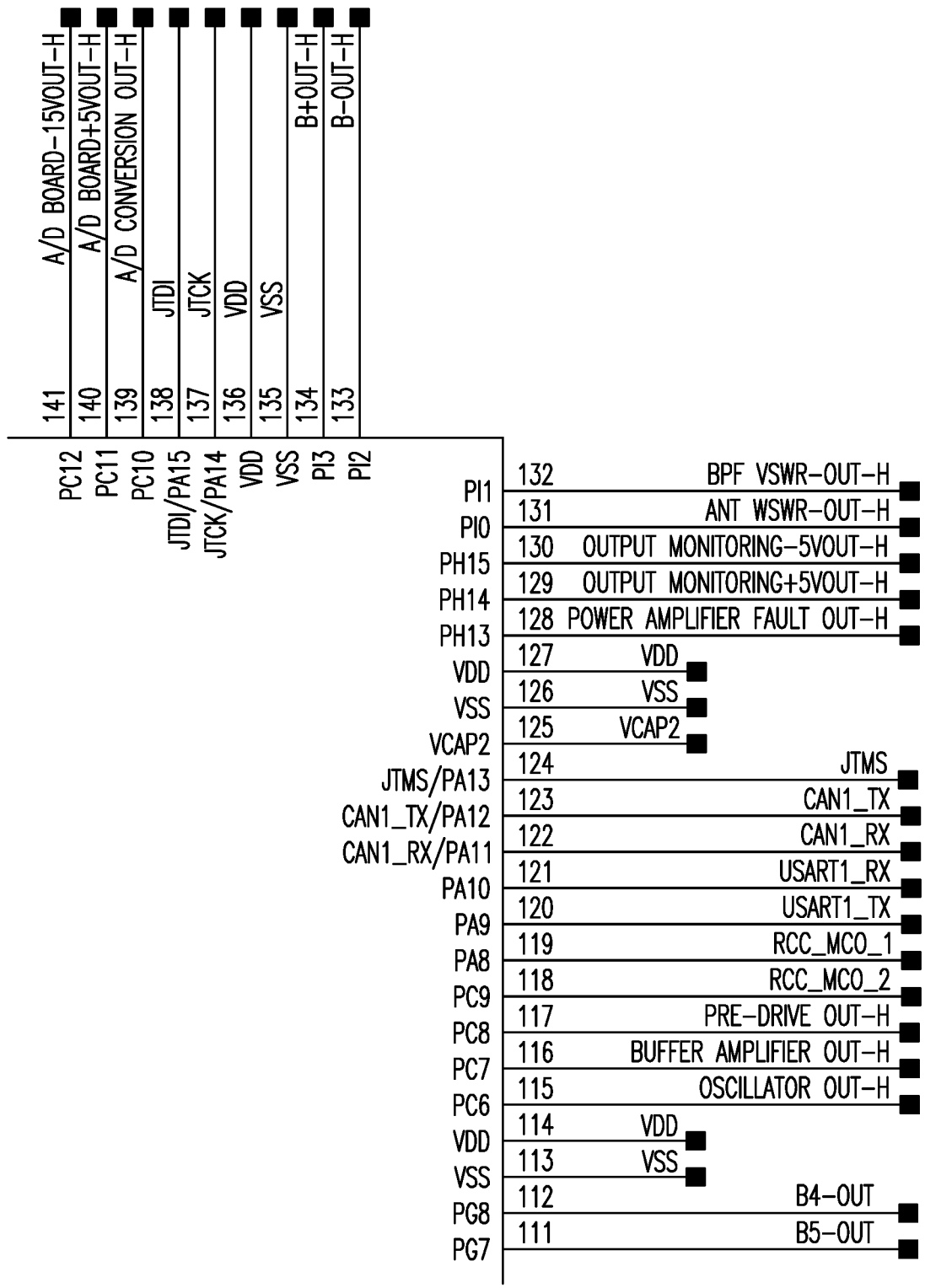
Figure 2F:
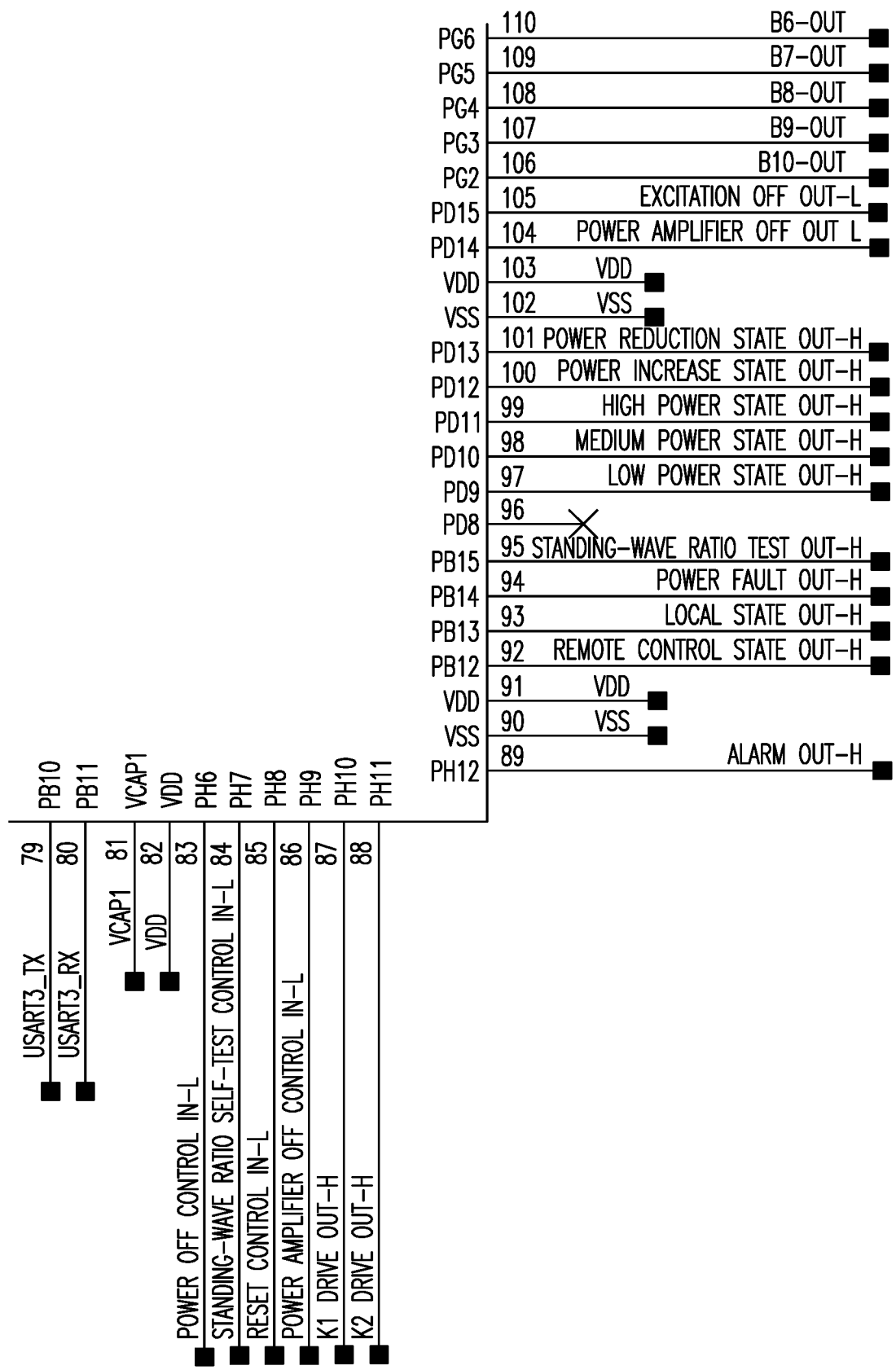

The STM32F429 microprocessor 1 may have 176 pins, 166 of which are used in the embodiment, to achieve data transmission between the STM32F429 microprocessor 1 and components such as the sampling unit 2, the storage unit 3, the host computer 4, the touch screen 5, the drive unit 6, the local network server units 7, the image acquisition unit 8 and other peripherals. The pins are distributed as shown in FIG. 2, shown collectively as FIGS. 2A-2F.

Figure 3:
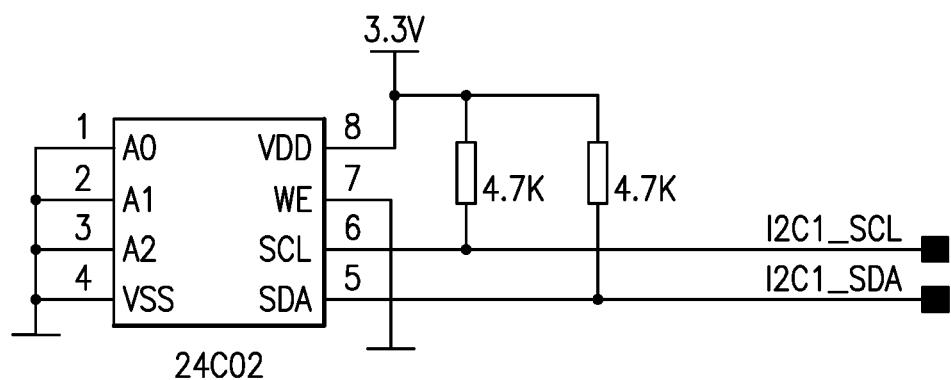
FIG. 3 is a circuit diagram of a storage unit of the described system.

The STM32F429 microprocessor 1 may be further connected to the storage unit 6, which stores a control parameter and ensures that the parameter will not be lost during power failure and can be inquired by the host computer 4. A circuit diagram of the storage unit 6 is as shown in FIG. 3.

Figure 4:
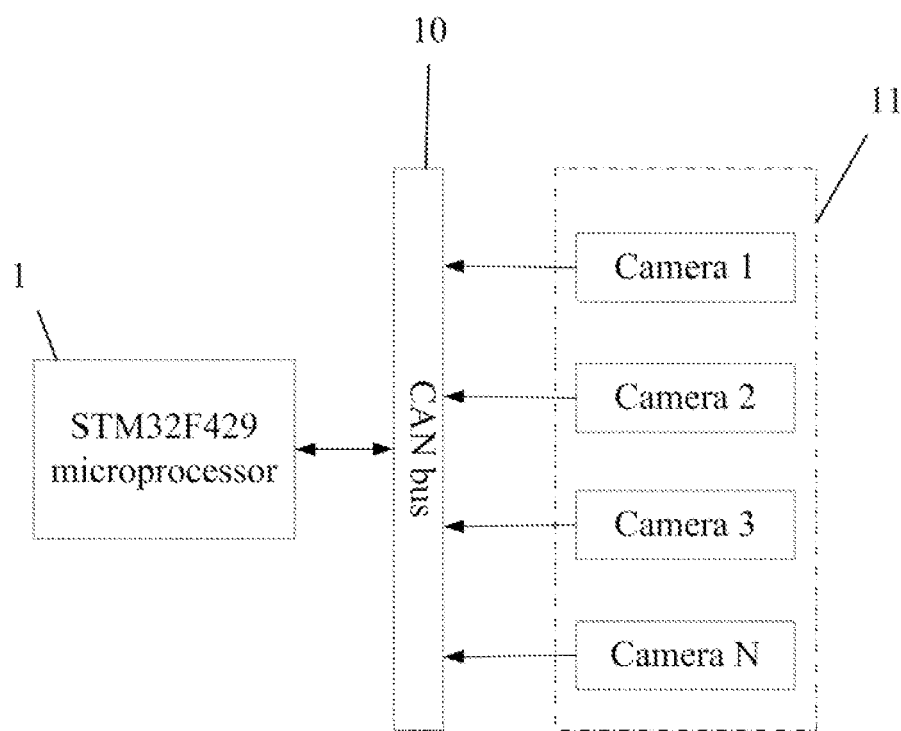
FIG. 4 is a schematic diagram of an image acquisition unit of the described system.

The STM32F429 microprocessor 1 may be further connected to the image acquisition unit 8, which is configured to acquire an image of a key position in the transmitter. A schematic diagram of the image acquisition unit 8 is as shown in FIG. 4, wherein cameras 11 mounted in the transmitter send acquired image information to the STM32F429 microprocessor 1 through the controller area network (CAN) bus 10.

Figure 5:
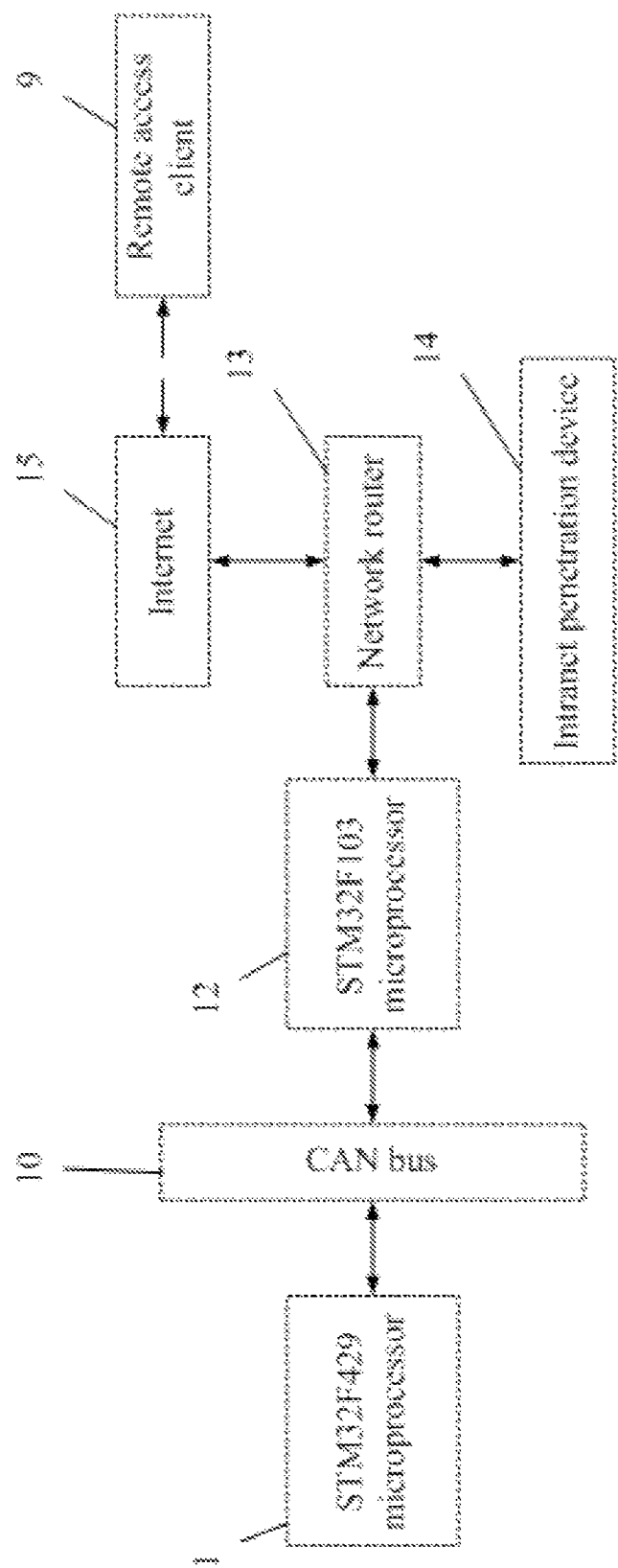
FIG. 5 is a schematic diagram of a local network server unit in accordance with aspects of the invention.

The STM32F429 microprocessor 1 may be further connected to the local network server unit 7, which is configured to achieve real-time remote network access of the remote access client 9 to information of the transmitter, and real-time remote network control of the remote access client 9 to a running state of the transmitter. A schematic diagram of the local network server unit 7 is as shown in FIG. 5 wherein, an STM32F103 microprocessor 12 may run a program of a local server, and communicate with the STM32F429 microprocessor 1 through the controller area network (CAN) bus 10. In addition, the STM32F103 microprocessor 12 may be further connected to a network router 13 through an Ethernet interface. The network router 13 may distribute a fixed intranet IP address for the local server. Equipment in a same local area network may access the server and interact with the transmitter through the IP address. The network router 13 may be connected to an intranet penetration device 14 and the Internet 15 through a cable, which are configured to map the IP address of the local server in an intranet into the domain name of the public network. Therefore, the remote access client 9 may access to the local server through inputting a fixed domain name by a browser, and achieve remote network display and control of the transmitter.

Figure 6:
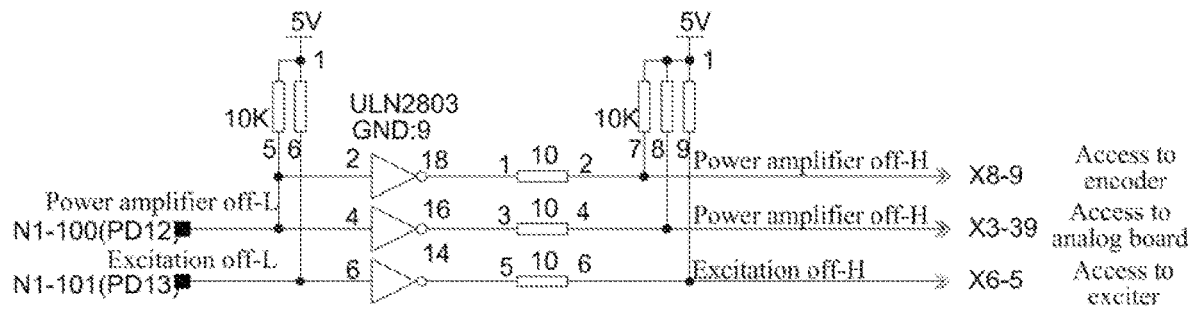
FIG. 6 is a circuit diagram of a group of drive circuits in accordance with aspects of the invention.

As shown in FIG. 6, the drive unit 3 may include 53 parallel drive circuits, each of which is connected to a corresponding external output end.

Figure 7:
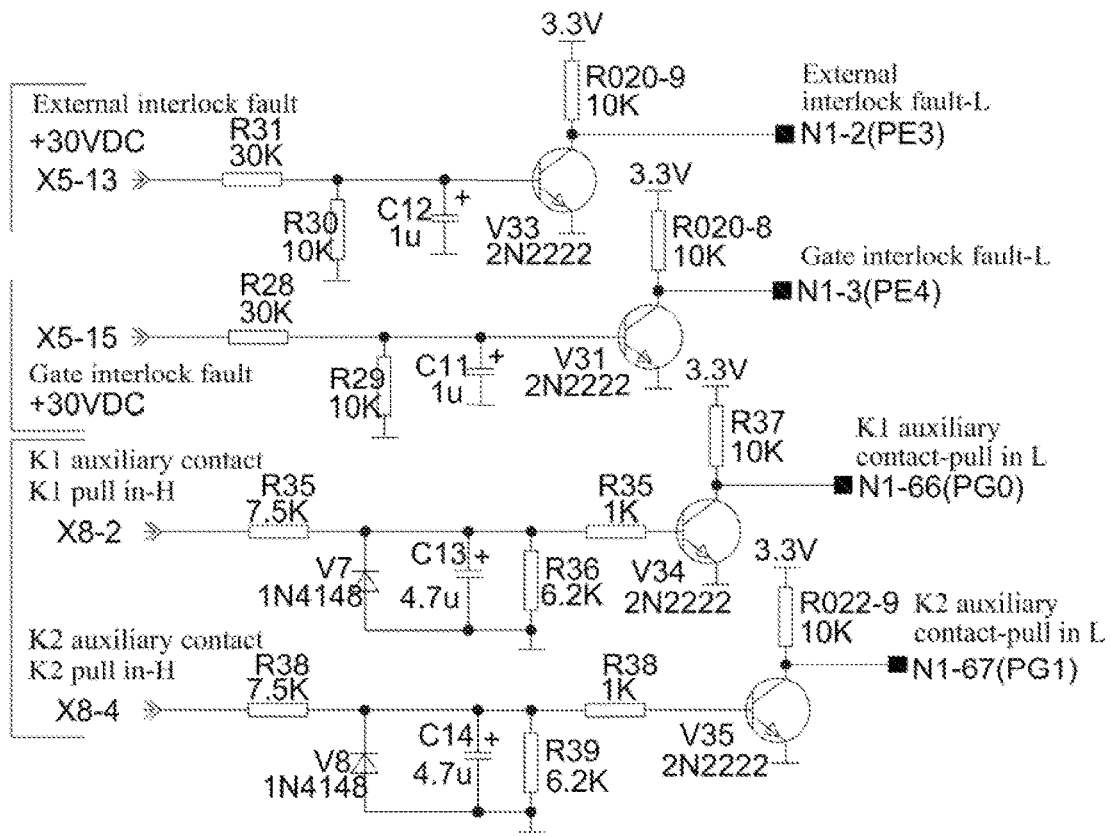
FIG. 7 is a circuit diagram of an exemplary group of digital signal acquisition circuits in accordance with aspects of the invention.

The sampling unit 2 may include 41 parallel digital signal acquisition circuits, as shown in FIG. 7.

Figure 8:
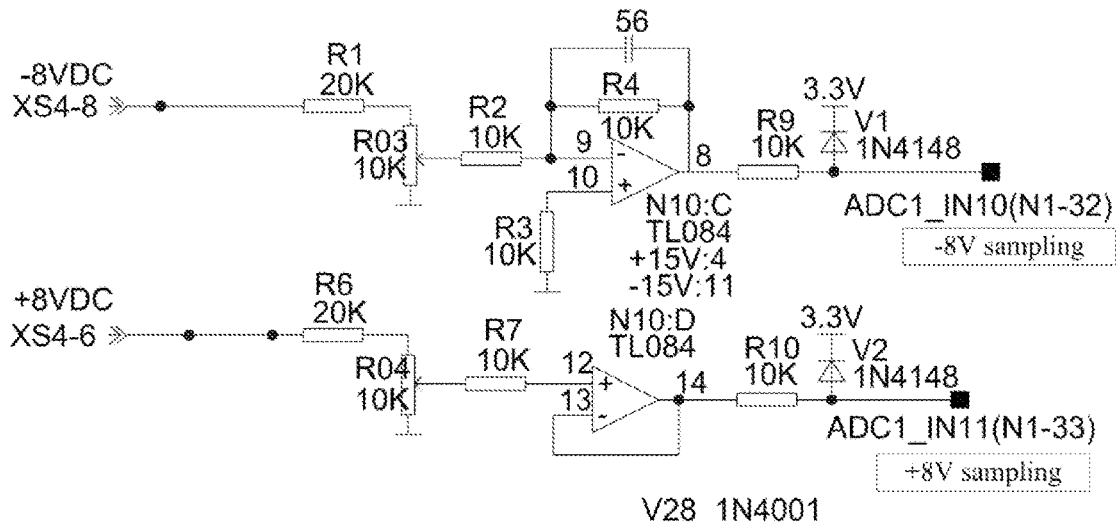
FIG. 8 is a circuit diagram of a group of exemplary analog signal acquisition circuits in accordance with aspects of the invention.

The sampling unit 2 may include 14 parallel analog signal acquisition circuits, as shown in FIG. 8.

Figure 9:
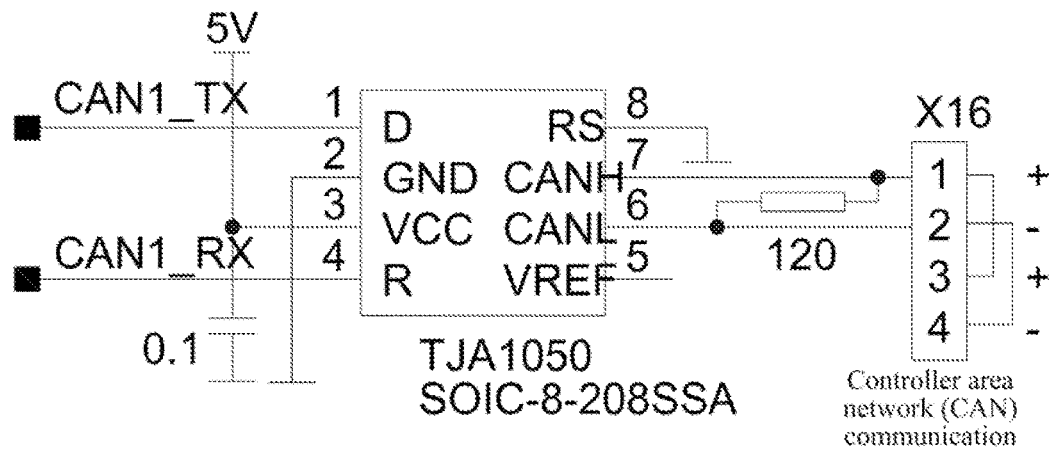
FIG. 9 is a circuit diagram of an exemplary controller area network (CAN) bus interface in accordance with aspects of the invention.

A circuit of the controller area network (CAN) bus for communication between the STM32F429 microprocessor 1 and the image acquisition unit 8, as well as between the STM32F429 microprocessor 1 and the local network server unit 7 is as shown in FIG. 9.

Figure 10:
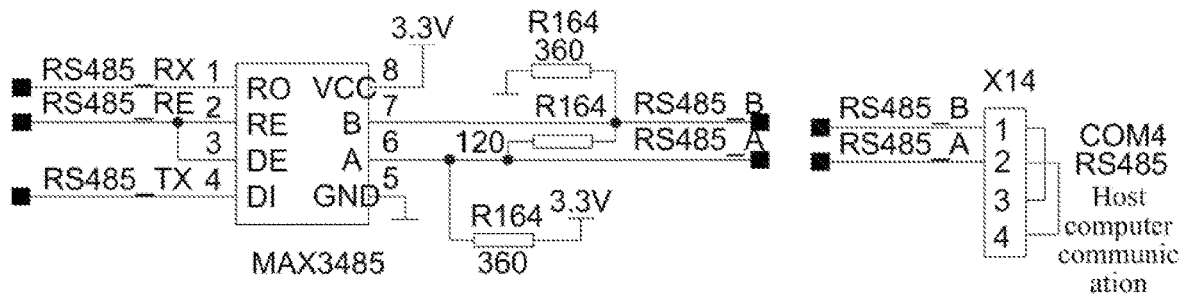
FIG. 10 is an exemplary circuit diagram of an RS485 standard serial interface in accordance with aspects of the invention.

A circuit of the RS485 standard serial interface for communication between the STM32F429 microprocessor 1 and the host computer 4 is as shown in FIG. 10.

Figure 11:
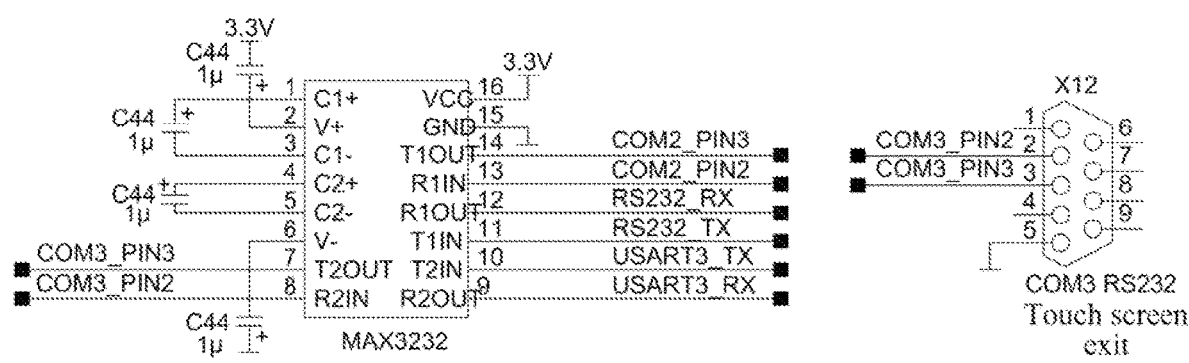
FIG. 11 is an exemplary circuit diagram of an RS232 bus interface in accordance with aspects of the invention.

A circuit of the RS232 bus interface for communication between the STM32F429 microprocessor 1 and the touch screen unit 5 is as shown in FIG. 11.

The STM32-based automatic control system for a broadcast transmitter may use the STM32F429 microprocessor 1 as a logic control center for computation of automatic control, to build a hardware design platform, thereby designing various functional modules and data transmission interface modules.

The host computer 4/touch screen unit 5/remote access client 9 may send information of high-power power on, medium-power power on, low-power power on, power on, power increase, power reduction, power amplifier off, reset, voltage increase, voltage reduction and timely power on/power off to the STM32F429 microprocessor 1 through RS485/RS232/network communication. After receiving an instruction, the STM32F429 microprocessor 1 may immediately analyze the instruction, and acquire digital quantities such as running state information and fault information of the transmitter, as well as analog quantities such as information of an incident power, a power amplifier voltage and a power amplifier current through the sampling unit 2, thereby conducting logic judgment and outputting the information to the drive unit such that the transmitter executes a specified operation when conditions permit.

Meanwhile, when not receiving a real-time instruction from the host computer 4/touch screen unit 5/remote access client 9, the STM32F429 microprocessor 1 may automatically adjust each component of the transmitter to a corresponding working state according to set working power, working frequency and power on/power off time, and continuously acquire the incident power, the power amplifier voltage, the power amplifier current and fault state data of the transmitter. As a result, the transmitter may automatically adjust the incident power and the power amplifier voltage, or execute fault reset and restart during unstable work. Accordingly, the transmitter may maintain normal work, and conduct automatic power off and alarm, thereby protecting hardware of the transmitter.

The STM32F429 microprocessor 1 also may display the state information, the fault information, the incident power, the power amplifier voltage and the power amplifier current of the transmitter acquired through RS232/RS485/network communication on a graphical interface of the touch screen 5/host computer 4/remote access client 9. In addition, the control parameter stored in the storage unit 6 may not be lost and can be inquired by the host computer 4.

The described embodiments are merely some rather than all of the embodiments of the present disclosure. All other embodiments obtained by a person of ordinary skill in the art based on the embodiments of the present disclosure without creative efforts shall fall within the protection scope of the present disclosure.

What is claimed is:

1. An STM32-based automatic control system for a broadcast transmitter, comprising an STM32 microcontroller;
    a host computer, configured to send an instruction to the STM32 microcontroller;
    a drive unit, configured to drive the transmitter to execute the instruction sent by the STM32 microcontroller;
    a sampling unit, comprising digital signal acquisition circuits, configured to acquire running state information and/or fault information of the transmitter; and analog signal acquisition circuits, configured to acquire information of an incident power, a power amplifier voltage and/or a power amplifier current of the transmitter;
    an image acquisition unit, comprising several cameras, configured to acquire an image of a key position in the transmitter;
    a touch screen unit, configured to display the information and/or send an instruction to the STM32 microcontroller;
    a storage unit, wherein the storage unit stores a control parameter for inquisition of the host computer, and when the system is power off, the storage unit can ensure that the parameter will not be lost; and
    a local network server unit, configured to achieve communication between the STM32 microcontroller and a remote access client through an Internet;
    wherein, the host computer, the touch screen unit and the remote access client can send instruction information to the STM32 microcontroller, such as information of high-power power on, medium-power power on, low-power power on, power off, power increase, power reduction, power amplifier off, reset, voltage increase, voltage reduction and/or timely power on/power off;
    when receiving the instruction information, the STM32 microcontroller analyzes the instruction information, acquires running state information, fault information, and information of the incident power, the power amplifier voltage and the power amplifier current of the transmitter through the sampling unit, conducts logic judgment based on the instruction information and sampling information, and outputs the information to the drive unit such that the transmitter executes a specified operation when conditions permit;
    when not receiving the instruction information, the STM32 microcontroller continues to acquire the sampling information, and controls the drive unit to adjust each component of the transmitter to a corresponding working state according to the stored instruction information;

when determining that the transmitter works unstably, the STM32 microcontroller adjusts the incident power and/or the power amplifier voltage according to a result of the logic judgment, and executes fault reset and/or restart if the problem is not solved; and if still determining that the transmitter is in an insoluble fault state after reset and restart, the STM32 controller controls the transmitter to conduct power off and alarm.

2. The system according to claim 1, wherein the STM32 microcontroller can display the state information, the fault information, the incident power, the power amplifier voltage and/or the power amplifier current of the transmitter on the touch screen unit, the host computer and/or the remote access client in real time.

3. The system according to claim 1, wherein the image acquisition unit comprises several cameras, each of which shoots a key part of the transmitter to obtain image information, and in which the image information is transmitted to the remote access client through the local network server unit.

4. The system according to claim 1, wherein the local network server unit comprises an STM32F103ZET6 chip, a network router and an intranet penetration device, the STM32F103ZET6 chip being connected to the STM32 microcontroller through a controller area network (CAN) bus and further connected to the network router, wherein the intranet penetration device is connected to the Internet through the network router, and in which the remote access client can be connected to the local network server unit through the Internet.

5. The system according to claim 4, wherein the network router distributes a fixed IP address for a local server, and equipment in a same local area network can interact with the transmitter through the IP address, wherein the intranet penetration device can map the IP address of the local server in the intranet into a domain name of a public network; and the remote access client can interact with the transmitter through the domain name.

6. A method for controlling a transmitter by the system according to claim 1, the method comprising the following steps:
receiving, by the STM32 microcontroller in real time, the sampling information acquired by the sampling unit;
conducting, by the STM32 microcontroller when instruction information is received, logic judgment based on the instruction information and the sampling information, and outputting the information to the drive unit such that the transmitter executes a specified operation when conditions permit; and controlling, by the STM32 microcontroller before new instruction information is received, the drive unit to adjust each component of the transmitter to a corresponding working state according to the stored instruction information; and
when determining that the transmitter works unstably, adjusting, by the STM32 microcontroller, the incident power and/or the power amplifier voltage according to a result of the logic judgment, and executing fault reset and/or restart if the problem is not solved; and if still determining that the transmitter is in an insoluble fault state after reset and restart, controlling, by the STM32 microcontroller, the transmitter to conduct power off and alarm.

7. The method according to claim 6, wherein the STM32 microcontroller can display the state information, the fault information, the incident power, the power amplifier voltage and/or the power amplifier current of the transmitter on the touch screen unit, the host computer and/or the remote access client in real time.

8. The method according to claim 6, wherein the image acquisition unit comprises several cameras, each of which shoots a key part of the transmitter to obtain image information, and transmitting the image information to the remote access client through the local network server unit.

9. The method according to claim 6, wherein the local network server unit comprises an STM32F103ZET6 chip, a network router and an intranet penetration device, wherein the STM32F103ZET6 chip is connected to the STM32 microcontroller through a controller area network (CAN) bus and further connected to the network router, and in which the intranet penetration device is connected to the Internet through the network router, and the remote access client can be connected to the local network server unit through the Internet.

10. The method according to claim 9, wherein the network router distributes a fixed IP address for a local server, and equipment in a same local area network can interact with the transmitter through the IP address, wherein the intranet penetration device can map the IP address of the local server in the intranet into a domain name of a public network, and in which the remote access client can interact with the transmitter through the domain name.

11. The method according to claim 6, wherein the image acquisition unit timely acquires an image of a key part in the transmitter, and uploads the image to the Internet through the local network server unit; and the remote access client can access to the image through the Internet, and remotely send an instruction to the STM32 microcontroller through the Internet.

* * * * *